United States Patent [19]

Westfall

[11] Patent Number: 4,654,488
[45] Date of Patent: Mar. 31, 1987

[54] PUSH AND ROCKER ACTION SWITCH

[75] Inventor: Alan P. Westfall, Calgary, Canada

[73] Assignee: Northern Telecom Limited, Montreal, Canada

[21] Appl. No.: 844,500

[22] Filed: Mar. 26, 1986

[51] Int. Cl.[4] .................. H01H 3/00; H01H 13/50
[52] U.S. Cl. .................. 200/5 R; 200/5 A; 200/17 R; 200/159 B; 200/339; 200/340; 200/153 K
[58] Field of Search ............ 200/5 R, 5 A, 6 A, 17 R, 200/18 R, 153 K, 159 B, 339, 340; 179/90 K, 158 R

[56] References Cited

U.S. PATENT DOCUMENTS

| | | | |
|---|---|---|---|
| 2,863,010 | 12/1958 | Riedl | 200/5 R |
| 3,691,324 | 9/1972 | Brantingson | 200/5 E |
| 4,029,915 | 6/1977 | Ojima | 200/5 A X |
| 4,132,873 | 1/1979 | Vanderpoel | 200/339 X |
| 4,386,245 | 5/1983 | Nimura et al. | 200/5 A X |
| 4,401,864 | 8/1983 | Ichikawa | 200/339 X |

Primary Examiner—J. R. Scott
Attorney, Agent, or Firm—J. E. Moorhouse

[57] ABSTRACT

A push and rocker action switch includes a pair of switchable contacts, either of which is switchable in response to a rocker motion of a depressible actuating member, and both of which are switchable at the same time in response to an overall push depression of the actuating member. The actuating member is positioned by an opening defined in a faceplate such that it is centrally supported by a resiliently yieldable pivot. The pivot and the switchable contacts are provided by raised portions in an elastomeric sheet material which is supported by a circuit board fastened to an underside of the faceplate.

6 Claims, 6 Drawing Figures

PUSH AND ROCKER ACTION SWITCH

FIELD OF THE INVENTION

The invention is in the field of manually operable electrical switch apparatus and more particularly pertains to switches being manually operable by both rocker and push actuation.

BACKGROUND OF THE INVENTION

Switches operable by various actuation mechanical motions such as, toggle, rocker, rotary and push are well-known. In the field of telephony and more particularly telephone apparatus, momentary push to actuate switches are used in abundance. However for some functions such as volume control of loudspeaker receivers and ringers a rocker action switch is frequently used. One advantage of the rocker switch is that it brings two related switching functions into a single ergonomically convenient structure. For example in application for adjustment of volume, depression of one end of a rocker switch adjusts the volume by an incremented step in a louder direction and depression of another end of the rocker switch adjusts the volume by an incremented step in a softer direction.

Recently with respect to electronic tone ringers in telephone sets, in addition to the volume being adjustable, one of two ringing cadences is also provided for selection by the telephone user. As there is yet another selectable function, another momentary push to actuate switch for cadence selection has been provided in the telephone so equipped.

One of the means by which the multitude of switching functions in a modern telephone set is accomplished, is that of a flexible elastomeric sheet material which is sandwiched between a faceplate and a contact carrying circuit board. A momentary switch connection between two conductors on the circuit board is made by a conductive button carried by the elastomeric sheet material and which is flexed into contact between the conductors by actuation of an associated push button. A similar structure is used to provide the rocker switch. In this arrangement a conductive button is carried by the elastomeric sheet material under each end of an elongated actuating member. The actuating member is carried at a pivot point such that one or the other but not both of the associated conductive buttons may be flexed into contact with the intended circuit board conductors.

SUMMARY OF THE INVENTION

It is an object of the invention to provide a manually actuated switch whereby both volume and cadence of a telephone tone ringer are conveniently adjustable.

In accordance with the invention a push and rocker action switch includes first and second contact means being spaced apart one from the other and a pivot formation being positioned between the first and second contact means. An actuating member covers the contact means and is supported by the pivot such that depression of either end of the actuating member causes a corresponding rocker motion about the pivot and switching operation of one or the other of the contact means. The pivot formation is a resiliently yieldable structure such that the depression of the entire actuating member causes the pivot formation to be compressed and both of the contacts to be actuated at the same time.

In accordance with one example of the invention a telephone set includes a faceplate with an elongated actuating member residing in the faceplate over an elastomeric sheet material. The elastomeric sheet material is carried on a circuit board fastened to the underside of the faceplate. A pivot is positioned between two contact means in the sheet material. The pivot is in a form of a protuberance in the sheet material and extends therefrom a distance to support the actuating member for rocking motion and accompanying switch actuation of respective ones of the contact means by depression of one end or the other of the actuating member. The pivot is arranged to be resiliently collapsible upon application of pressure over the length of the actuating member such that both of the contact means can be actuated at the same time.

BRIEF DESCRIPTION OF THE DRAWINGS

An example embodiment is described with reference to the accompanying drawings in which.

DETAILED DESCRIPTION

Figure 1:
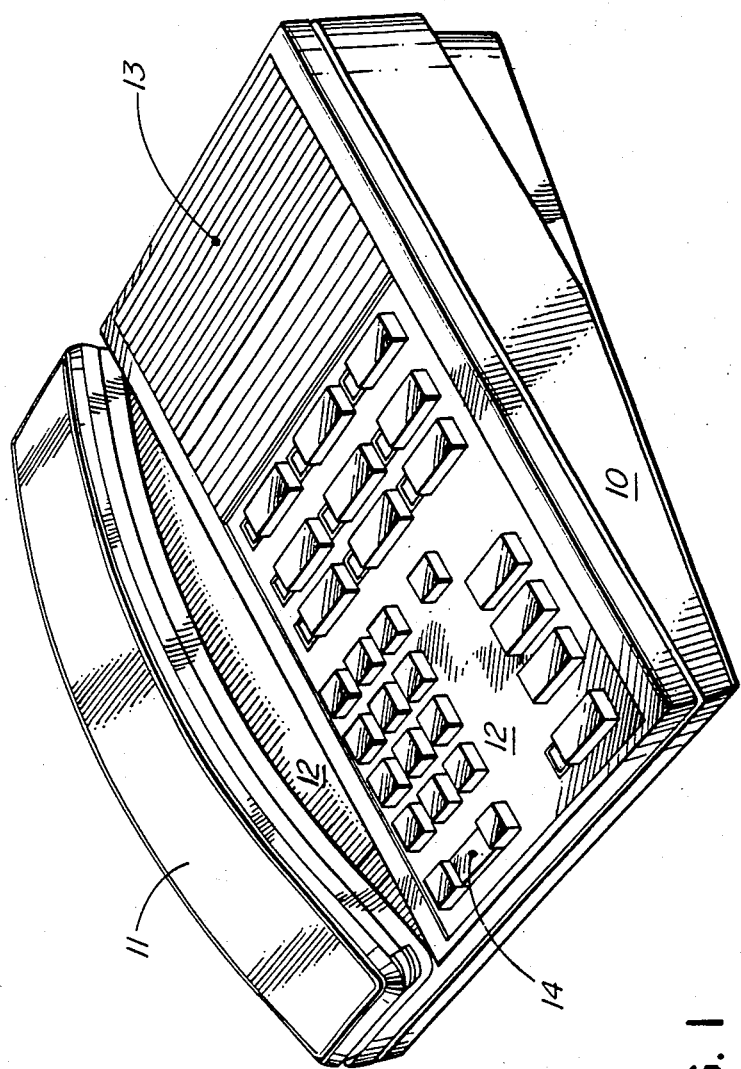
FIG. 1 is a perspective view of a telephone set wherein a push and rocker action switch in accordance with the invention is useful.

FIG. 1 illustrates a push button telephone set of recent popular useage and which was first manufactured by Northern Telecom Limited and includes volume adjustment for loudspeaker operation. The telephone set includes a hand set 11, supported on a front face 12 which is carried by a base 10. The front face 12 is in part occupied by a loudspeaker grill 13 and by a multitude of push button elements, which are not of any significance to the understanding of the invention and hence are not hereafter mentioned, with the exception of a rocker action switch located at 14. In accordance with the invention the rocker action switch also includes a push action switch function. The push and rocker action switch, in addition to providing for user initiated changes in volume, also permits a user to select between two additional states of audio presentation, which in this example are two different rythms or cadences of ringing signals. This added feature is achieved without alteration to the front face 12 of the telephone set.

Figure 2:
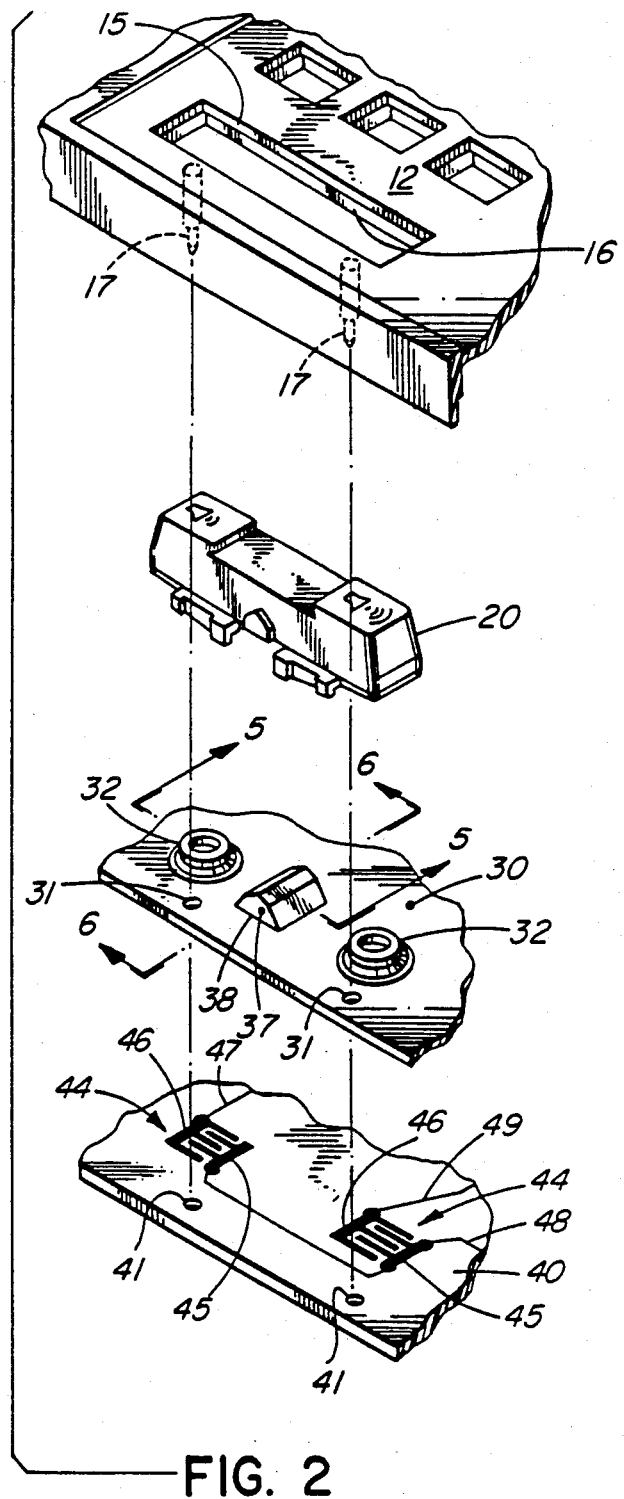
FIG. 2 is an exploded view of part of an assembly of the telephone set in FIG. 1 wherein the push and rocker action switch is located.
Figure 3:
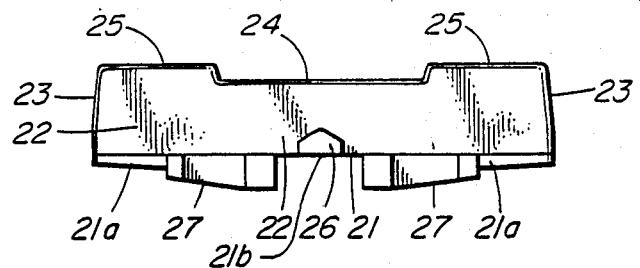
FIG. 3 is a side view of an actuating member used in the push and rocker action switch illustrated in FIG. 2.
Figure 4:
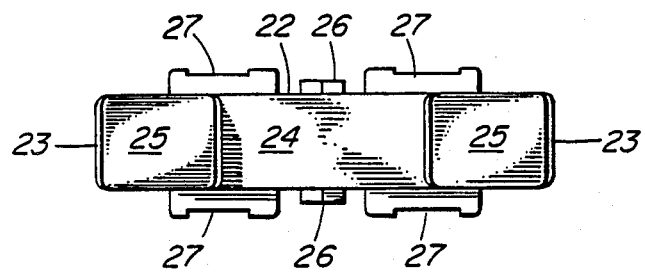
FIG. 4 is a plan view of the actuating member illustrated in FIG. 3.

The push and rocker action switch is described in more detail with reference to FIGS. 2 to 5. In FIG. 2 part of the front face 12 is shown to include a rectangular opening 15 defined in the front face. A skirt 16 depends a predetermined distance from an underside of the front face, surrounding the opening 15 and is regularly spaced therefrom. The opening 15 in this instance corresponds to the location 14 in FIG. 1. The opening 15 accepts an actuating member 20 in the form of an elongated body for residence therein. The actuating member includes a lower surface 21 being bounded by long and shorter side walls 22 and 23 which terminate at an upper surface 24. The upper surface 24 includes finger pads 25 as shown. Spacers 27 extend outwardly from lower edges of the long side walls 22 and in assembly with the front face 12 act in loose fit with the skirt 16 to laterally center the actuating member 20 in the opening 15 and thereby prevent skuffing of the walls 22 against the edges of the opening 15. Pivot formations 26 extend from the side walls 22 equidistant from the side walls 23 and in assembly with the front face reside against the underside of the front face 12 to limit protrusion of the actuating member 20 beyond the upper surface of the front face 12. The side walls 23 are angled slightly inwardly toward the finger pads 25 as shown to accommodate rocker action.

A portion of an elastomeric sheet 30 in FIG. 2 includes resilient contact formations 32 and a resiliently collapsible pivot formation 37 being spaced equidistant between the two shown contact formations 32. In assembly, tangs 17, only two of which are visible depending from the underside of the front face 12, are received in corresponding openings 31 in the elastomeric sheet 30. The contact formations 32 and the pivot formation 37 are spaced in relation to the openings 31 such that in assembly, alignment of the contact formations 32 with the surface 21 of the actuating member 20 in areas indicated at 21a, and alignment of the pivot formation 37 with the surface 21 of the actuating member 20 at an area indicated at 21b, is achieved.

A portion of a circuit board 40 in FIG. 2 includes openings 41 for receiving and fastening with the tangs 17, such that conductor patterns at 44 are in alignment with the contact formations 32 in the elastomeric sheet 30. Each of the conductor patterns at 44 includes a plurality of interspaced conductors 45 and 46 arranged such that at least a pair of the conductors is overlapped by a conductive button 36, shown in FIG. 5. One of the conductor patterns 44 provides for contacts between leads 47 and 48 and the other of the conductor patterns provides for contact between the leads 48 and 49. The leads 47, 48 and 49 are for connection to electronic circuitry, not shown, which responds to momentary electrical make switch states of the leads for regulating loudspeaker volume and selecting ringing cadence in the telephone set.

Figure 5:
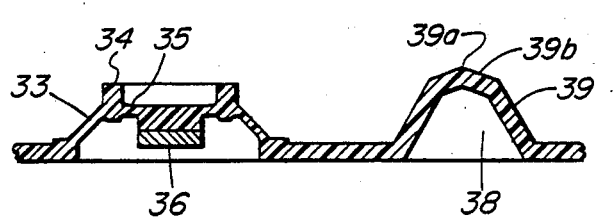
FIG. 5 is a sectional view of contact and pivot structure in FIG. 2, taken along a line 5—5.

The contact formations 32 are described in more detail, with reference to FIG. 5 in conjunction with the elastomeric sheet 30 in FIG. 2. Each of the contact formations is a circular protrudance having thin collapsible side walls 33, terminating at a thickened ring 34. A thinner membrane 35 spans an underside of the ring 34 and carries a conductive button 36, as shown. The conductive button 36 is provided by a carbon impregnated rubber compound. In use, the surface at 21a of the actuating member 20 when pressed against the ring 34 causes the side wall 33 to buckle which subsequently places the conductive button 36 into physical contact with the conductors 45 and 46. Upon release of pressure the contact formation returns to its rest state as shown with the conductive button 36 having been withdrawn from the conductors 45 and 46.

Figure 6:
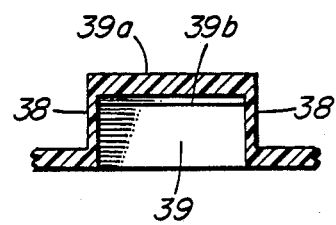
FIG. 6 is a sectional view of the pivot structure taken along a line 6—6 in FIG. 2.

The pivot formation 37 is described in more detail with reference to FIGS. 5 and 6 in conjunction with the elastomeric sheet 30 in FIG. 2.

The pivot formation 37 is provided by a pair of upwardly inclined walls 39 which join to a pair of lesser inclined walls 39b, which meet at an apex 39a. In this example the apex is located along a line normal to a line between the two contact formations 32. Ends of the walls 39 and 39b are joined by end walls 38 as shown. The thickness of the end walls 38 is less than the thickness of the walls 39 and 39b. In operation the pivot formation 37 is stiff enough to resist significant deformation from pressure applied at either one or the other of the finger pads 25, such pressure of course normally being applied by a user with the intent of causing rocker switch action. However, when pressure is applied along the actuating member, for example on the surface 24 or on both the finger pads 25 at the same time, the pivot formations 37 begins to yield by deformation. At first the deformation causes a slight downward displacement of the walls 39b and a slight compression of the walls 39. The downward displacement is resisted by compression of the thinner end walls 38. Further downward deformation of the walls 39b causes the end walls 38 to buckle such that resistance to further deformation by the end walls 38 is reduced. Hence most of the downward loading beyond this point of deformation is consequently concentrated upon the walls 39, whereby the bulk of the elastomeric material effectively resisting extreme deformation is less than the bulk of the elastomeric material which resists slight deformation. Consequently the increase in pressure upon the actuating member 20 for causing an extreme deformation of the pivot formation 37 and the accompanying push switch actuation is not as great as would be required were the end walls 38 of the same thickness as the inclined walls 39.

The pivot formation 37 is described in more detail with reference to FIGS. 5 and 6 in conjunction with the elastomeric sheet 30 in FIG. 2.

What is claimed is:

1. A push and rocker action switch comprising:
    first and second contact means being spaced apart one from the other and a pivot positioned between the first and second contact means,
    an actuating member covering the contact means and being supported by the pivot, such that depression of either end of the actuating member causes a rocker motion about the pivot and a switching operation of one or the other of the contact means;
    elements of the first and second contact means being provided by depressible portions of an elastomeric sheet material, said depressible portions being arranged in juxtaposition with the ends of the actuating member; and
    the pivot being provided by a raised formation in the elastomeric sheet material whereby said pivot is resiliently yieldable such that depression of the entire actuating member is permitted to effect a switching of both the contact means at the same time.

2. A push and rocker switch as defined in claim 1 wherein each of the depressible elements of each of the contact means is provided by a hollow protuberance extending toward a surface of the actuating member for contact therewith and a conductive material being centrally carried within the protuberance for contact with conductors carried by a circuit board against which the elastomeric sheet is supported; and
    an apex of the raised formation lying along a line normal to a line between central portions of the protuberances and being raised to a degree sufficient to carry said surface of the actuating member spaced from at least one of the protuberances.

3. A push and rocker action switch as defined in claim 2 wherein the actuating member and the elastomeric sheet are confined between a faceplate and the circuit board, the surface of the actuating member being bounded by longer and shorter side walls and being positioned by peripheral edges of an opening defined in the faceplate, each of the longer side walls including a pivot formation adjacent the surface and equidistant from the shorter walls, each pivot formation being a lateral projection adjacent said surface for contacting a portion of the under surface of the faceplate adjacent one of the peripheral edges.

4. A push and rocker action switch as defined in claim 1 wherein the raised formation in the elastomeric sheet material comprises:

a first pair of upwardly inclined walls;

a second pair of lesser inclined walls, each extending from one of the first pair of walls and meeting at an apex along a line normal to a line between the first and second contact means;

the first and second pairs of walls being of at least a first predetermined wall thickness; and a pair of end walls each joining the ends of the first and second pair of walls and the elastomeric sheet and being of a second wall thickness, the second wall thickness being thinner than the first predetermined wall thickness.

5. A push and rocker action switch as defined in claim 1 wherein the raised formation comprises a plurality of resilient elements, at least one of which being so arranged as to collapse when only slightly compressed and thereby cause the associated compressional force to be concentrated upon other of the resilient elements.

6. A telephone set having a faceplate with an elongated actuation member residing in the faceplate over an elastomeric sheet material carried on a circuit board fastened to the underside of the faceplate, a pivot being positioned between two contact means in the sheet material, the pivot being in a form of a protuberance in the sheet material and extended therefrom a distance to support the actuation member for rocking motion and accompanying switch actuation of a respective one of the contact means by depression of one end or the other of the actuation member, the pivot being resiliently collapsible upon application of significant pressure over the length of the actuating member to cause switch actuation in both of the contact means at the same time.

* * * * *